(12) United States Patent
Chitalia et al.

(10) Patent No.: US 12,423,672 B2
(45) Date of Patent: *Sep. 23, 2025

(54) AUTHENTICATION SYSTEMS AND METHODS USING LOCATION MATCHING

(71) Applicant: Visa International Service Association, San Francisco, CA (US)

(72) Inventors: Jalpesh Chitalia, Castro Valley, CA (US); Ansar Ansari, San Ramon, CA (US)

(73) Assignee: Visa International Service Association, San Francisco, CA (US)

(*) Notice: Subject to any disclaimer, the term of this patent is extended or adjusted under 35 U.S.C. 154(b) by 1149 days.

This patent is subject to a terminal disclaimer.

(21) Appl. No.: 17/149,008

(22) Filed: Jan. 14, 2021

(65) Prior Publication Data

US 2021/0142312 A1  May 13, 2021

Related U.S. Application Data

(63) Continuation of application No. 15/431,235, filed on Feb. 13, 2017, now Pat. No. 10,922,672.

(Continued)

(51) Int. Cl.
*G06Q 20/32* (2012.01)
*G06Q 20/38* (2012.01)
*H04W 12/63* (2021.01)

(52) U.S. Cl.
CPC ..... *G06Q 20/3224* (2013.01); *G06Q 20/3276* (2013.01); *G06Q 20/385* (2013.01); *H04W 12/63* (2021.01)

(58) Field of Classification Search
CPC .......... G06Q 20/3224; G06Q 20/3276; G06Q 20/385; G07C 9/28; G07C 2209/63;
(Continued)

(56) References Cited

U.S. PATENT DOCUMENTS 9,928,518 B1 * 3/2018 Vippagunta ........ G06Q 20/3224
10,922,672 B2   2/2021 Chitalia et al.
(Continued)

FOREIGN PATENT DOCUMENTS

CN    102272767 A    12/2011
CN    104838399 A    8/2015
(Continued)

OTHER PUBLICATIONS

AU2017218013, "Fourth Examination Report", Mar. 22, 2022, 5 pages.

(Continued)

*Primary Examiner* — Eric T Wong
(74) *Attorney, Agent, or Firm* — Kilpatrick Townsend & Stockton LLP (57) ABSTRACT

According to some embodiments of the invention, an authentication method is provided. Transaction data for a transaction is received at a communication device from an access device or a resource provider. The transaction data comprises a location of the access device. A location of the communication device is determined by the communication device. It is determined whether a distance between the location of the access device and the location of the communication device is within a predetermined threshold. The transaction is not authorized if the distance between the location of the access device and the location of the communication device is not within a predetermined threshold.

19 Claims, 6 Drawing Sheets

Related U.S. Application Data (60) Provisional application No. 62/294,471, filed on Feb. 12, 2016.

(58) Field of Classification Search
CPC ...... G01S 19/13; H04L 9/3213; H04W 4/023; H04W 4/80; H04W 12/63
See application file for complete search history.

(56) References Cited

U.S. PATENT DOCUMENTS

| | | |
|---|---|---|
| 2009/0187492 A1 | 7/2009 | Hammad et al. |
| 2011/0124317 A1 | 5/2011 | Joo |
| 2011/0238514 A1 | 9/2011 | Ramalingam et al. |
| 2011/0307710 A1 | 12/2011 | McGuire et al. |
| 2012/0022965 A1 | 1/2012 | Seergy |
| 2012/0290468 A1 | 11/2012 | Benco et al. |
| 2013/0214902 A1 | 8/2013 | Pineau et al. |
| 2013/0238455 A1* | 9/2013 | Laracey ............... G06Q 20/102 705/21 |
| 2013/0268378 A1 | 10/2013 | Yovin |
| 2014/0012757 A1 | 1/2014 | Henderson et al. |
| 2014/0081783 A1 | 3/2014 | Paranjape et al. |
| 2014/0108263 A1 | 4/2014 | Ortiz et al. |
| 2014/0222594 A1 | 8/2014 | Rose et al. |
| 2014/0337138 A1 | 11/2014 | Chitalia et al. |
| 2014/0372308 A1 | 12/2014 | Sheets |
| 2014/0380424 A1 | 12/2014 | Thompson |
| 2015/0032625 A1 | 1/2015 | Dill et al. |
| 2015/0032627 A1 | 1/2015 | Dill et al. |
| 2015/0088674 A1 | 3/2015 | Flurscheim et al. |
| 2015/0142673 A1 | 5/2015 | Nelsen et al. |
| 2015/0199689 A1 | 7/2015 | Kumnick et al. |
| 2015/0235195 A1 | 8/2015 | Lee |
| 2015/0248664 A1* | 9/2015 | Makhdumi ......... G06Q 20/3274 235/380 |
| 2015/0312038 A1* | 10/2015 | Palanisamy .......... G06Q 20/385 713/155 |
| 2015/0356560 A1 | 12/2015 | Shastry et al. |
| 2016/0042263 A1 | 2/2016 | Gaddam et al. |
| 2017/0221054 A1* | 8/2017 | Flurscheim ......... G06Q 20/3276 |
| 2017/0236113 A1 | 8/2017 | Chitalia et al. |
| 2018/0144339 A1 | 5/2018 | Beidas |
| 2021/0264434 A1* | 8/2021 | Sheets ................... G06Q 20/40 |

FOREIGN PATENT DOCUMENTS

| | | |
|---|---|---|
| CN | 104883686 A | 9/2015 |
| EP | 2634739 | 9/2013 |
| JP | 2013513158 A | 4/2013 |
| JP | 2016524249 A | 8/2016 |
| WO | 2013113004 A1 | 8/2013 |
| WO | 2014202951 A1 | 12/2014 |
| WO | 2015179922 A1 | 12/2015 |
| WO | 2017139772 | 8/2017 |

OTHER PUBLICATIONS

CN201780009300.8 , "Notice of Decision to Grant", Jan. 11, 2022, 4 pages.
AU2022202599 , "Second Examination Report", Aug. 30, 2023, 4 pages.
CA3,009,364 , "Office Action", Aug. 24, 2023, 5 pages.
JP2022-152306 , "Office Action", Aug. 15, 2023, 4 pages.
AU2017218013 , "First Examination Report", Apr. 20, 2021, 3 pages.
CN201780009300.8 , "Office Action", Jun. 23, 2021, 14 pages.
EP17750971.8 , "Notice of Decision to Grant", Jun. 24, 2021, 2 pages.
AU2022202599 , "Third Examination Report", Feb. 6, 2024, 5 pages.
CN201780009300.8 , "Office Action", Jan. 12, 2021, 19 pages.
JP2018-541140 , "Office Action", Mar. 5, 2021, 5 pages.
Application No. EP21186580.3 , Extended European Search Report, Mailed on Oct. 20, 2021, 9 pages.
AU2022202599 , "First Examination Report", Apr. 20, 2023, 6 pages.
EP 21186583.3, "Examination Report", May 5, 2023, 4 pages.
AU2017218013 , "Second Examination Report", Aug. 30, 2021, 4 pages.
IN201847033161 , "First Examination Report", Jul. 30, 2021, 6 pages.
AU2017218013 , "Third Examination Report", Oct. 28, 2021, 6 pages.
JP2018-541140 , "Office Action", Nov. 24, 2021, 3 pages.
U.S. Appl. No. 15/431,235 , "Final Office Action", Jun. 13, 2019, 35 pages.
U.S. Appl. No. 15/431,235 , "Final Office Action", Aug. 4, 2020, 6 pages.
U.S. Appl. No. 15/431,235 , "Non-Final Office Action", Mar. 16, 2020, 13 pages.
U.S. Appl. No. 15/431,235 , "Non-Final Office Action", Nov. 29, 2018, 33 pages.
U.S. Appl. No. 15/431,235 , "Notice of Allowance", Oct. 14, 2020, 10 pages.
EP17750971.8 , "Extended European Search Report", Oct. 8, 2018, 12 pages.
EP17750971.8 , "Office Action", Apr. 9, 2020, 4 pages.
PCT/US2017/017682 , "International Preliminary Report on Patentability", Aug. 23, 2018, 7 pages.
PCT/US2017/017682 , "International Search Report and Written Opinion", Feb. 10, 2017, 10 pages.
Zhang et al., "Location-Based Authentication and Authorization Using Smart Phones", 2012 IEEE 11th International Conference on Trust, Security and Privacy in Computing and Communications, 2012, pp. 1285-1292.
JP2018-541140 , "Office Action", Jun. 7, 2022, 5 pages.
AU2022202599 , "Fourth Examination Report", Apr. 18, 2024, 3 pages.
CN202210312351.0 , "Office Action", Mar. 19, 2025, 13 pages.
CA3,009,364 , "Office Action", Nov. 22, 2022, 5 pages.

* cited by examiner

AUTHENTICATION SYSTEMS AND METHODS USING LOCATION MATCHING

CROSS-REFERENCES TO RELATED APPLICATIONS

This application is a Continuation of U.S. patent application Ser. No. 15/431,235, filed Feb. 13, 2017, which claims the benefit of U.S. Provisional Patent Application No. 62/294,471, filed Feb. 12, 2016, entitled "AUTHENTICATION SYSTEMS AND METHODS USING MERCHANT AND CONSUMER LOCATIONS", and are hereby incorporated by reference in their entirety.

BACKGROUND

A transaction is typically authorized by a user at the time the transaction is requested from a resource provider. For example, a cardholder may authorize a purchase at a point of sale. The user's sensitive information, such as a primary account number (PAN), access number, or PIN number, may be communicated by a device utilized to conduct the transaction (e.g., a credit card, a mobile device, a communication device, a security device, etc.). However, users may not want to share their sensitive information with resource providers due to security concerns.

Therefore, a secure and efficient method is needed to provide more users with the capability to conduct transactions using their devices, while keeping their sensitive information hidden from resource providers. This reduces the risk both of fraud by the resource provider, as well as interception and misuse of the sensitive information by reducing the number of parties to which the sensitive information is communicated.

To further prevent fraud by unauthorized parties, authorizing entities may institute authentication systems to ensure that sensitive information is being used in a transaction by an authorized user. However, better authentication methods are needed for face-to-face transactions. An authorizing entity may see an authorization request message from a resource provider containing a user's sensitive information, but may have no way to verify that the authorized user of the sensitive information is actually at the resource provider. For example, an unauthorized user may have stolen and misappropriated the sensitive information (e.g., a stolen credit card). Embodiments of the invention address this and other problems, individually and collectively.

SUMMARY

According to some embodiments of the invention, systems and methods are provided that allow users to use their communication devices to perform payment transactions, without requiring the use of a contactless element or specialized hardware at the merchant. In addition, systems and methods are provided that authenticate users in face-to-face transactions with resource providers using their respective locations.

According to some embodiments of the invention, a method of conducting a transaction between a user and a resource provider is provided. The method comprises receiving, at a communication device of the user, transaction data for the transaction from an access device associated with the resource provider. The transaction data comprises a location of the access device and sensitive information. The method further comprises determining, by the communication device, a location of the communication device. The method further comprises determining, by the communication device or a remote computer in communication with the communication device, if a distance between the location of the access device and the location of the communication device is within a predetermined threshold. The transaction is not authorized if the distance between the location of the access device and the location of the communication device is not within the predetermined threshold. The transaction is further processed using a token corresponding to the sensitive information if the distance between the location of the access device and the location of the communication device is within the predetermined threshold.

Embodiments of the invention are further directed to a communication device comprising a processor and a non-transitory computer readable medium. The computer readable medium can comprise code, executable by the processor, for implementing the above method or any of the methods described herein.

Embodiments of the invention are further directed to a server computer comprising a processor and a non-transitory computer readable medium. The computer readable medium can comprise code, executable by the processor, for implementing any of the methods described herein.

These and other embodiments of the invention are described in further detail below.

DETAILED DESCRIPTION

According to some embodiments of the invention, systems and methods are provided that allow users to use their communication devices to perform transactions, without requiring the use of a contactless element or specialized hardware at the resource provider. In addition, systems and methods are provided that authenticate users in face-to-face transactions with resource providers using their respective locations.

Before discussing specific embodiments and examples, some descriptions of terms used herein are provided below.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The POS terminal may or may not initiate processing of transactions.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

A "code" may be any system of words, letters, numbers, figures, and/or other symbols substituted for data. Exemplary codes include barcodes, QR codes, SKUs, etc.

A "communication device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "consumer" may include an individual or a user that operates a communication device to conduct a transaction on an account or otherwise manage an account. The consumer may also be referred to as a cardholder, accountholder, or user. The term "consumer" may be used interchangeably with the term "user."

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "issuer" may typically refer to a business entity (e.g., a bank) that maintains an account for a user. An issuer may also issue payment credentials stored on communications devices.

A "location" may refer to a particular place or position of something. A location may be physical (e.g., the location of a house) or intangible (e.g., a website or IP address). A location may be represented in any suitable manner, including an address, GPS coordinates, a latitude, a longitude, combinations thereof, and/or the like.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

"Sensitive information" may be any suitable information that can be used in a manner detrimental to a legitimate holder of the sensitive information, if exposed. Sensitive information may be in any suitable form. Examples of sensitive information may include accounts numbers such as primary account numbers, PINs, device identifiers, secure element identifiers, etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "service provider" or "application provider" may be an entity that can provide a service or application. An example of a service provider is a digital wallet provider.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real account identifier (e.g., a primary account number (PAN)) may be tokenized by replacing the real account identifier with a substitute number that may be associated with the real account identifier. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

"Transaction data" may comprise any data associated with or indicative of a transaction between a resource provider (e.g., a merchant) and a user (e.g., a consumer). For example, transaction data may include resource provider data (e.g., merchant ID, card acceptor ID, etc.), user data, location data, transaction details (e.g., transaction ID, transaction amount, etc.), combinations thereof, and/or the like.

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Figure 1:
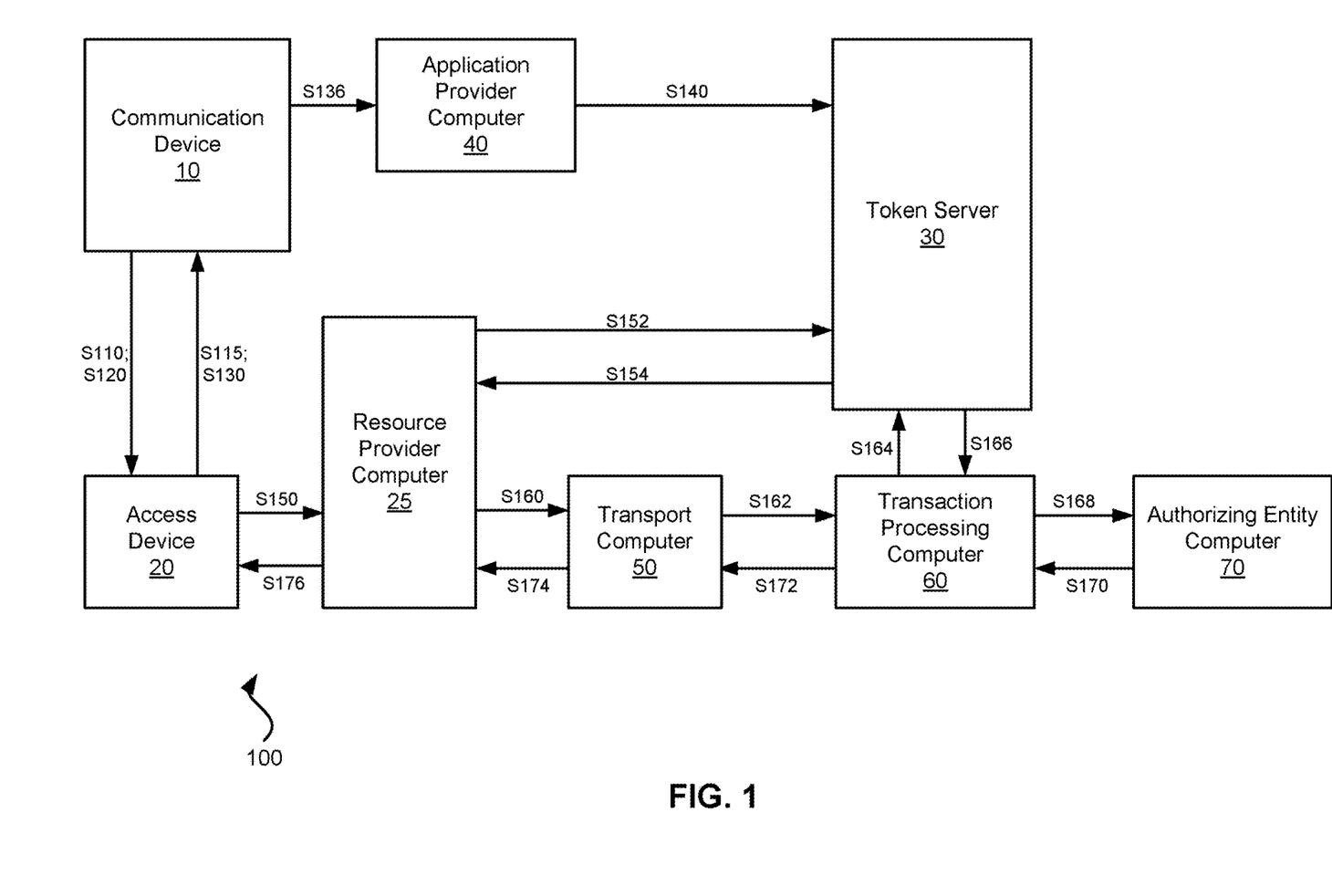
FIG. 1 shows a block diagram of an authentication system and method using location matching according to some embodiments of the present invention.

FIG. 1 shows a block diagram of an authentication system and method 100 using location matching according to some embodiments of the present invention. At step S110, a user of a communication device 10 may select a tender type at an access device 20 (e.g., a point of sale terminal associated with a resource provider) during a transaction with the resource provider (e.g., a purchase of an item or service). At step S115, the access device 20 may provide a code to the communication device 10. The code may have been previously generated by access device 20 or may have been generated in real time by access device 20. The code may be static (i.e., the same for multiple transactions) or dynamic (i.e., different for different transactions). The code may be displayed electronically by the access device 20, or may be printed on a piece of paper or otherwise displayed in a non-electronic fashion to the communication device 10.

The code may encode transaction data, including resource provider data (e.g., a resource provider identifier, a card acceptor identifier, etc.), the selected tender type, the location of the access device 20, the location of the access device 20 or the resource provider computer 25, transaction details such as a transaction amount, an identifier associated with the transport computer 50, an application identifier (AID), combinations thereof, and/or the like. In some embodiments, some of this transaction data, such as the transaction amount, may be omitted and/or may be provided later. In some embodiments, the code may be a QR code, a barcode, or any other code that may be used to represent data. In some embodiments, the code may be standardized across different transaction processing computers 60 (i.e., the code may be the same regardless of the transaction processor associated with the transaction). In some embodiments, the code may be different depending on the particular transaction processing computer 60.

The transaction data may further include a transaction type, in some embodiments, such as a flag or indicator indicating how the transaction will be processed (e.g., whether to use a card verification number (CVN), a token authentication verification value (TAVV), an original credit transaction (OCT), etc.). The transaction data may be analyzed to determine that the transaction type indicator is one of a plurality of transaction type indicators associated with a plurality of different transaction types. Then, transaction processing may be initiated according to the transaction type indicator. The transaction type may be determined by which type(s) the particular resource provider computer 25 and/or the transport computer 50 are capable of processing. For example, a directory of resource provider computers 25 and enrolled transaction types may be queried. The transaction type may indicate the parties involved and the sequence of steps to be taken to process the transaction. However, this information may remain transparent to the user (e.g., the consumer), so that the user experience remains the same regardless of the transaction type.

At step S120, the user of the communication device 10 may open an application and use the communication device 10 to scan the code at the access device 20. The communication device 10 may scan the code using a camera incorporated into the communication device 10 or any other visual detection device incorporated into or associated with the communication device 10, for example. At step S130, the application residing on the communication device 10 reads the code to extract the transaction data, including the location of the access device 20, and optionally displays it to the user. If displayed, the transaction data may be confirmed by the user. In other embodiments, the code may be in the form of data that can be transmitted through a wireless of contact-based communication protocol. Wireless protocols may include NFC, Bluetooth, IR, etc.

In some embodiments, a transaction amount (e.g., a purchase amount, an amount of access to provide, what to provide access to, etc.) may not be provided in the code. Thus, a transaction amount may not be included in the transaction data extracted from the code. In these embodiments, the user may enter the transaction amount into the communication device 10 after scanning the code. In some embodiments, the communication device 10 may display a list of sensitive information that may be used to complete the transaction (e.g., a list of primary account numbers (PANs), payment devices, passwords, PINs, etc.), and allow the user to select one or more pieces of sensitive information from the list.

Further at step S130, the application on the communication device 10 may cause the communication device 10 to determine the current location of the communication device 10. This may be determined, for example, by a GPS device within or operatively connected to the communication device 10, as described further herein. However, it is contemplated that the current location of the communication device 10 may be determined according to any method, including, for example, triangulation between cellular towers and the like.

In some embodiments, the application on the communication device 10 may determine if a distance between the location of the access device 20 and the location of the communication device 10 is within a predetermined threshold. The predetermined threshold may be any threshold distance indicative of the presence of the user of the communication device 10 at or near the access device 20, and may be set by the user of the communication device 10, the application provider computer 40, or any party involved in the transaction. For example, the predetermined threshold may be 100 feet. In these embodiments, at step S136, the application on the communication device 10 may encrypt the transaction data, the selected sensitive information to be used for the transaction, and an indication of whether the distance is within the predetermined threshold, and provide it to the application provider computer 40. The application provider computer 40 may be the provider of the application on the communication device 10. In some embodiments, the application provider computer 40 is the same computer or associated with the same entity as the authorizing entity computer 70.

In some embodiments, the application on the communication device 10 does not determine if the distance between the location of the access device 20 and the location of the communication device 10 is within a predetermined threshold. Instead, at step S136, the application on the communication device 10 may encrypt the transaction data (including the location or address of the access device 20 or the resource provider, and/or and identifier for the access device 20 or the resource provider), the selected sensitive information to be used for the transaction, and the location (e.g., latitude and longitude) of the communication device 10, and provides this information to the application provider computer 40. The application provider computer 40 may decrypt the data, and determine if the distance between the location of the access device 20 and the location of the communication device 10 is within a predetermined threshold. In such embodiments, the location of the access device 20 may be pre-stored as latitude and longitudinal coordinates, or an identifier (e.g., an address) of the access device 20 or the resource provider associated with the access device 20 may be used to determine the latitude and longitudinal coordinates of the access device 20 or the resource provider.

In some embodiments, the application provider computer 40 may not proceed with processing the transaction if the distance between the location of the communication device 10 and the location of the access device 20 is not within the predetermined threshold. In some embodiments, the application provider computer 40 may proceed with processing of the transaction if the distance is not within the predetermined threshold, but may generate data to be passed to the authorizing entity computer 70 that may indicate that the distance is not within the predetermined threshold. In the latter embodiments, the authorizing entity computer 70 may then decide whether or not to authorize the transaction based on the generated data and any other available authentication and/or authorization data.

In some embodiments, if the distance is within the predetermined threshold, then the application provider computer 40 may proceed with processing the transaction. Specifically, at step S140, the application provider computer 40 may validate the transaction data, and route a request for a token associated with the selected sensitive information to the token server 30, along with at least some of the transaction data (e.g., a transaction identifier). The token server 30 may generate a token for the transaction that is associated with the selected sensitive information and that is stored in conjunction with at least some of the transaction data. This allows the token server 30 to be able to uniquely identify the underlying transaction. For example, the token may be stored in conjunction with a transaction identifier.

Meanwhile, at step S150, the access device 20 may transmit the transaction data to the resource provider computer 25. At step S152, the resource provider computer 25 may send a request for the token for the transaction to token server 30. The request may include identifying transaction data, such as the transaction identifier previously provided to the token server 30 by the application provider computer 40. At step S154, the token server 30 may retrieve the token associated with the identifying transaction data, and provide it to the resource provider computer 25. Although shown as being in direct communication with the token server 30, it is contemplated that the application provider computer 40 may act as a middleman between the resource provider computer 25 and the token server 30 in some embodiments.

Authorization processing may then be conducted. For example, at step S160, the resource provider computer 25 may construct an authorization request message with the token and the transaction data and submit it to a transport computer 50. The transport computer 50 may forward the authorization request message to a transaction processing computer 60 at step S162. At step S164, the transaction processing computer 60 may request the sensitive information associated with the token from the token server 30, and receive it at step S166. At step S168, the transaction processing computer 60 may replace the token with the sensitive information in the authorization request message, and forward it to an authorizing entity computer 70 for authorization. The authorizing entity computer 70 may approve or deny the transaction request based upon a number of factors, including whether there are sufficient funds and/or credit in the account, whether the transaction is indicative of fraud, etc.

At step S170, the authorizing entity computer 70 may send an authorization response message (i.e., denying or allowing the transaction based on available funds, amount of access requested, etc.) to the transaction processing computer 60. Optionally, the transaction processing computer 60 may replace the sensitive information in the authorization response message with the token. The transaction processing computer 60 may forward the authorization response message to the transport computer 50 at step S172. The transport computer 50 may forward the authorization response message to the resource provider computer 25 at step S174, which may, in turn, forward the authorization response message or an indication of approval or denial of the transaction to the access device 20 at step S176. In some embodiments, the user of the communication device 10 may then be provided with a receipt or other proof of completion of the transaction. A clearing and settlement process may occur at the end of the day or at any other suitable time after completion of the transaction.

For simplicity of illustration, a certain number of components are shown in FIG. 1. It is understood, however, that embodiments of the invention may include more than one of each component. In addition, some embodiment of the invention may include fewer than or greater than all of the components shown in FIG. 1. In addition, the components shown in FIG. 1 may communicate via any suitable communication medium (including the Internet), using any suitable communications protocol.

Also, other variations on the process flow of FIG. 1 can be contemplated. For example, instead of sending the token from the token server 30 to the resource provider computer 25, it may be sent to the application provider computer 40, communication device 10, and/or the access device 20 for initial authorization processing. Further, although described with respect to a particular flow in FIG. 1, it is contemplated that embodiments of the invention may be integrated into other flows as well, such as those described in U.S. patent application Ser. No. 15/421,891, filed Feb. 1, 2017, entitled "SYSTEMS AND METHODS FOR CODE DISPLAY AND USE", which is hereby incorporated by reference in its entirety.

Figure 2:
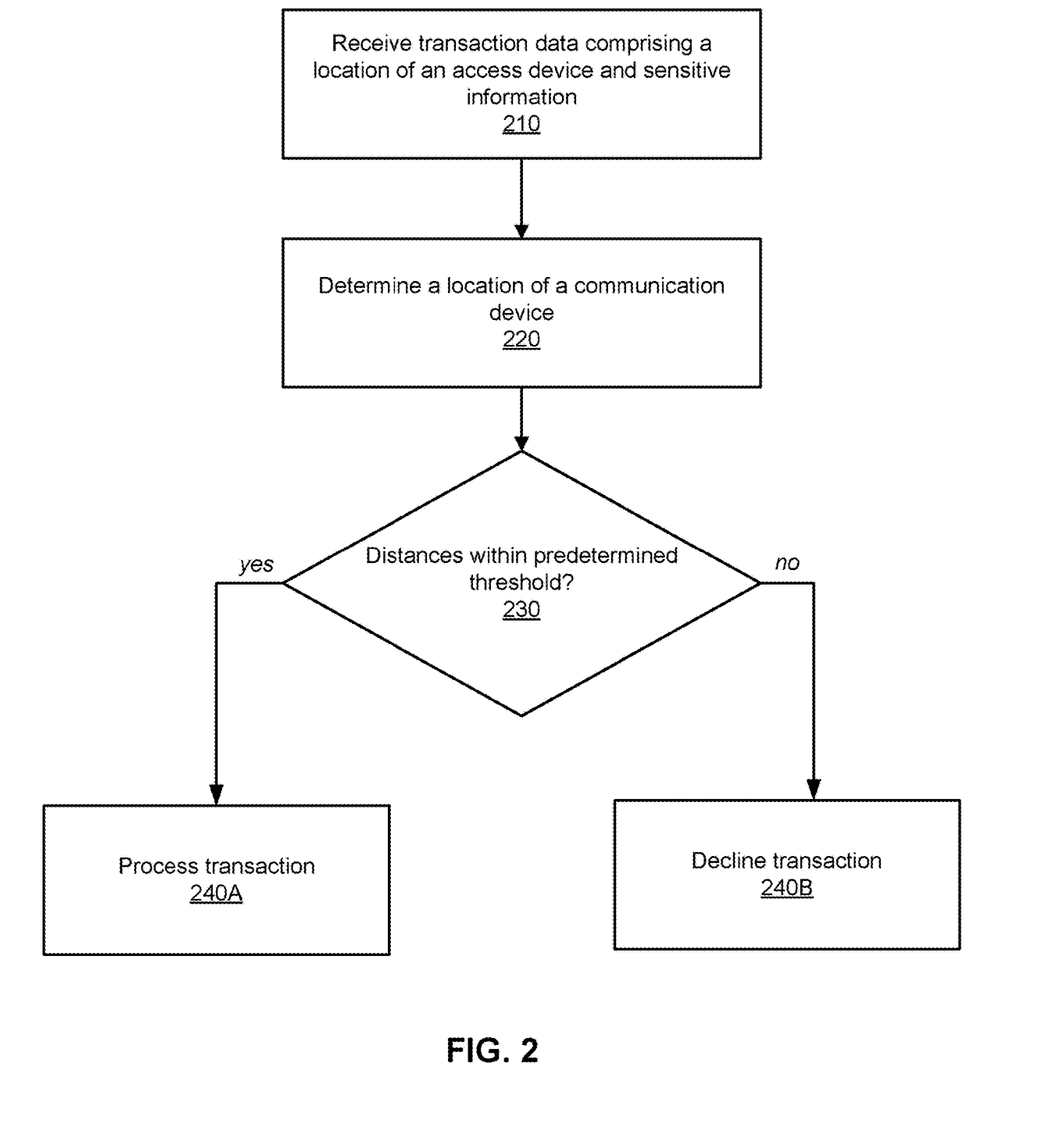
FIG. 2 shows a flow chart of an authentication method using location matching according to some embodiments of the present invention.

FIG. 2 shows a flow chart of an authentication method using location matching according to some embodiments of the present invention. At step 210, transaction data may be received at a communication device of a user (e.g., communication device 10 of FIG. 1) for a transaction. The transaction data may be received from an access device (e.g., access device 20) associated with a resource provider (e.g., resource provider computer 25). The transaction data may comprise a location of the access device. The location of the access device may be provided in any suitable format. For example, the location of the access device may be a physical address (e.g., 123 Main Street, Pleasantville, OH) or coordinates such as latitude and longitude. The transaction data may further comprise sensitive information, such as an account number. In some embodiments, the transaction data may further comprise a timestamp associated with the transaction data (i.e., a timestamp indicating the time at which the location of the access device was determined and sent).

At step 220, a location of the communication device may be determined by the communication device. The location of the communication device may be determined, for example, by a GPS device incorporated with or associated with the communication device. In another example, the location of the communication device may be triangulated using cellular towers. The location of the communication device may be in any suitable format. For example, the location of the communication device may be in coordinates, such as latitude and longitude. In some embodiments, the location of the communication device may also have an associated timestamp (i.e., a timestamp indicating the time at which the location of the communication device was determined).

At step 230, the communication device or a remote computer in communication with the communication device may determine if a distance between the location of the access device and the location of the communication device is within a predetermined threshold. The distance between the locations may be determined in any suitable manner, such as, for example, mapping the locations and measuring the distance between them. The remote computer may be, for example, resource provider computer 25, application provider computer 40, transaction processing computer 60, and/or authorizing entity computer 70 of FIG. 1. Further, in embodiments in which the location of the access device and the location of the communication device have associated timestamps, those timestamps may be compared at step 230 by the communication device or the remote computer in communication with the communication device to ensure that they are within a predetermined threshold time period.

In embodiments in which the communication device determines if the distance is within the predetermined threshold, the communication device may transmit an indicator to the remote computer that indicates whether the distance is within the predetermined threshold. The indicator may simply be a binary value such as 1 or 0 indicating "yes" or "no". Alternatively, the indicator may be the distance between the communication device and the access device (e.g., 50 feet, 2 miles, etc.). In embodiments in which the remote computer determines if the distance is within the predetermined threshold (or not within the predetermined threshold), the communication device may transmit the location of the access device and the location of the communication device to the remote computer.

If the distances are within the predetermined threshold, the transaction may be processed at step 240A. Further, in embodiments in which timestamps are used, the transaction may be processed at step 240A if the timestamps are within a predetermined threshold time period. For example, the transaction may be indicated as authentic and sent through the transaction processing network for authorization. In some embodiments, transaction processing may include generation and use of a token corresponding to the sensitive information for the transaction.

If the distance is not within the predetermined threshold, the transaction may be declined at step 240B. In other words, the transaction will not be authorized if the distance is not within the predetermined threshold. Further, in embodiments in which timestamps are used, the transaction may be declined at step 240B if the timestamps are not within a predetermined threshold time period. For example, if the location of the access device was sent 2 days before the location of the communication device was determined, the transaction may be declined as the two locations were not determined close in time to each other.

Although shown and described herein as the transaction being processed at step 240A and declined at step 240B, it is contemplated that any number of different outcomes may result from the steps performed in FIG. 2. For example, at step 240B, the transaction may instead be flagged for further authentication processing prior to authorization. In another example, different business rules may be applied to the transactions of step 240A and step 2406.

Figure 3:
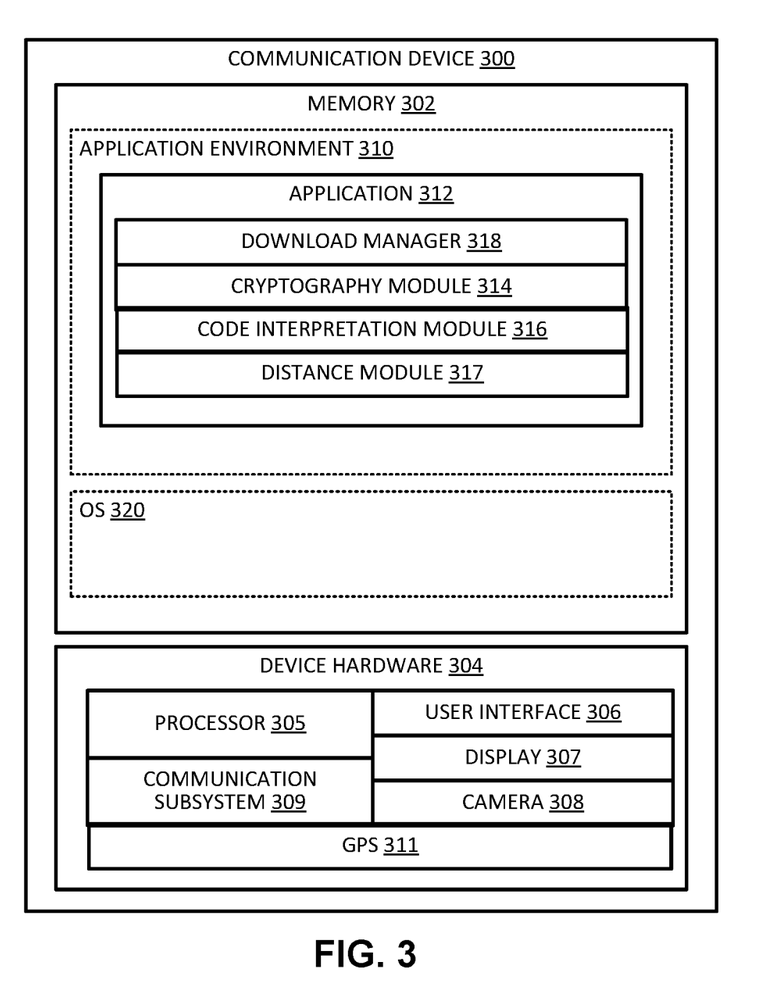
FIG. 3 shows a block diagram of a communication device according to some embodiments of the present invention.

FIG. 3 illustrates a block diagram of a communication device 300, according to some embodiments. Communication device 300 can be used, for example, to implement communication device 10 of FIG. 1. Communication device 300 may include device hardware 304 coupled to a memory 302. Device hardware 304 may include a processor 305, a communications subsystem 309, and a user interface 306. In some embodiments, device hardware 304 may include a display 307 (which can be part of user interface 306). Device hardware 304 may also include a camera 308, for example, which can be used as described herein to scan codes. However, embodiments of the invention are not limited to scannable codes. For example, additional hardware and/or software components may be included in communication device 300 to implement any communication protocol or technology to receive a code, including RF (contactless), Bluetooth, IR (infrared), etc. Device hardware 304 may also include a GPS 311, for example, which can be used as described herein to determine the location of the communication device 300. However, embodiments of the invention are not limited to GPS 311. Any suitable hardware and/or software may be included in communication device 300 to determine the location of communication device 300.

Processor 305 can be implemented as one or more integrated circuits (e.g., one or more single core or multicore microprocessors and/or microcontrollers), and is used to control the operation of communication device 300. Processor 305 can execute a variety of programs in response to program code or computer-readable code stored in memory 302, and can maintain multiple concurrently executing programs or processes. Communications subsystem 309 may include one or more RF transceivers and/or connectors that can be used by communication device 300 to communicate with other devices and/or to connect with external networks. User interface 306 can include any combination of input and output elements to allow a user to interact with and invoke the functionalities of communication device 300. In some embodiments, user interface 306 may include a component such as display 307 that can be used for both input and output functions.

Memory 302 can be implemented using any combination of any number of non-volatile memories (e.g., flash memory) and volatile memories (e.g., DRAM, SRAM), or any other non-transitory storage medium, or a combination thereof media. Memory 302 may store an operating system (OS) 320 and an application environment 310 where one or more applications reside including application 312 to be executed by processor 305.

Application 312 can be an application that uses, accesses, and/or stores sensitive information or tokens. For example, application 312 can be a wallet or payment application that uses PANs or tokens to conduct transactions via communication device 300. In some embodiments, access to application 312 by a user can be protected by user authentication data such as a password, passcode, PIN, etc. For example, when a user attempts to launch or execute application 312, the user may be requested to enter valid user authentication data before the user can access application 312. Application 312 may include a download manager 318, a cryptography module 314, a code determination module 316, and a distance module 317. In some embodiments, one or more of these components can be provided by another application or component that is not part of application 312.

Download manager 318 can be configured to, in conjunction with processor 305, provide functionalities to communicate with an application provider associated with application 312 (such as application provider computer 40 of FIG. 1) to download information via the application provider. Download manager 318 may, in conjunction with processor 305, request or otherwise manage the acquisition and/or storage of sensitive information and/or tokens. For example, download manager 318 may, in conjunction with processor 305, request and obtain sensitive information or token via the application provider associated with application 312, and store the sensitive information or token in sensitive information data store 316. In some embodiments, the sensitive information or token provided by the application provider can be received in an encrypted form. For example, the sensitive information or token can be encrypted with a session key generated by a token server. Download manager 318 may also, in conjunction with processor 305, receive, from the application provider, the session key in an encrypted form, and store the encrypted session key in a sensitive information data store.

Cryptography module 314, in conjunction with processor 305, may provide cryptographic functionalities for application 312. For example, cryptography module 314 may, in conjunction with processor 305, implement and perform encryption/decryption operations for application 312 using encryption algorithms such as DES, AES, TDES/TDEA, or the like, and/or hash functions such as SHA, or the like. For example, when application 312 accesses data stores within memory 302 to retrieve and use sensitive information or tokens stored therein (e.g., to conduct a transaction), application 316 may invoke cryptography module 314 to, in conjunction with processor 305, decrypt the session key that is used to encrypt the stored sensitive information or token, and then decrypt the sensitive information or token using the decrypted session key. The decrypted sensitive information or token can then be used by application 312.

Code determination module 316 may, in conjunction with processor 305, interpret or translate codes scanned by camera 308 into transaction data (including a location of an access device), as described further herein. Distance module 317 may, in conjunction with processor 305, determine if a distance between the location of the access device (translated by the code determination module 316) and the location of the communication device 300 (e.g., determined by the GPS 311) are within a predetermined threshold, as specified by the application 312, for example. Distance module 317 may further, in conjunction with processor 305, generate data indicating whether the distance is within a predetermined threshold.

Figure 4:
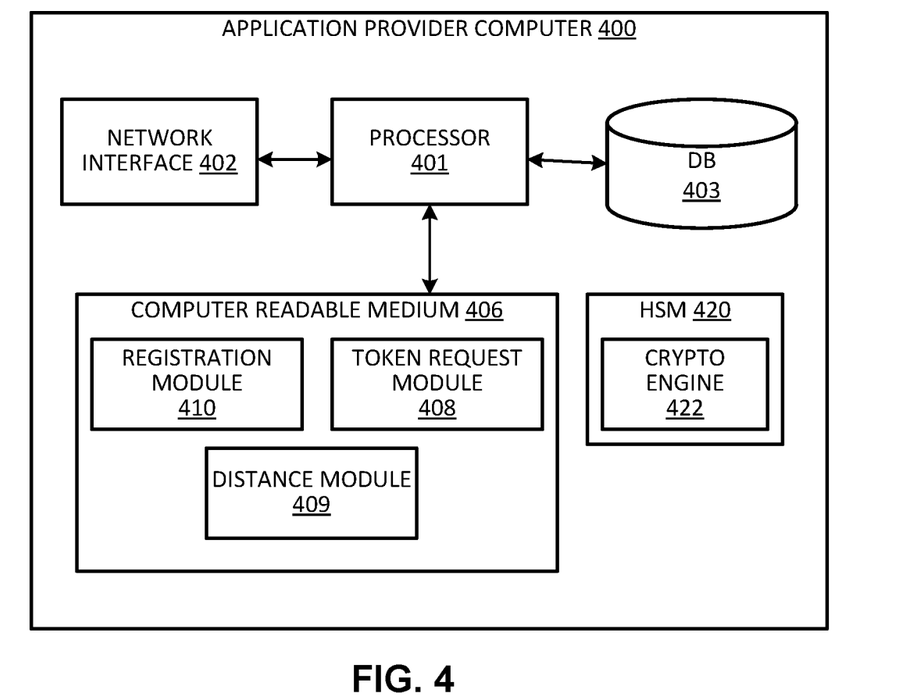
FIG. 4 shows a block diagram of an application provider computer according to some embodiments of the present invention.

FIG. 4 illustrates a block diagram of an application provider computer 400 associated with an application provider, according to some embodiments. For example, application provider computer 400 can be application provider computer 40 of FIG. 1, who provides a software application or services associated the application for a communication device 10. Application provider computer 400 may include a processor 401 coupled to a network interface 402 and a computer readable medium 406. In some embodiments, application provider computer 400 may also include a hardware security module (HSM) 420. Application provider computer 400 may also include or otherwise has access to a database 403 that may be internal or external to application provider computer 400.

Processor 401 may include one or more microprocessors to execute program components for performing the token request functions of application provider computer 400. Network interface 402 can be configured to connect to one or more communication networks to allow application provider computer 400 to communicate with other entities such as a communication device operated by a user, a token server computer, etc. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the token request functions of application provider computer 400. For example, computer readable medium 406 may include code implementing a registration module 410, a token request module 408 and a distance module 409. In some embodiments, application provider computer 400 may also include a hardware security module (HSM) 420 to implement a cryptography engine 422.

Registration module 410 may, in conjunction with processor 401, register users with application provider computer 400. For example, a user can be registered with the application provider by providing registration module 410 with user identifying information to identify the user, device information such as a device identifier associated with the user's communication device on which an application associated with the application provider is installed, account information such as an account identifier associated with the user's account, etc. In some embodiments, a user may set up user authentication data (e.g., password, passcode, PIN, etc.) via registration module 410. The user authentication data can be used by application provider computer 400 to authenticate the user when the application on the user's communication device communicates with application provider computer 400. Registration module 410 may also, in conjunction with processor 401, allow a user to change or update the user authentication data. The registration information can be stored in a user database 403. In some embodiments, the registration process can be carried out when the user first downloads the application for installation on the user's communication device, or when the user first launches and executes the application.

Token request module 408 is configured to, in conjunction with processor 401, facilitate requests for sensitive information or tokens received from the application installed on a user's communication device. In some embodiments, upon receiving a request from the application on the user's communication device, token request module 408 may, in conjunction with processor 401, authenticate the user and/or the communication device by verifying the user authentication data and device identifier of the communication device against the previously registered information stored in user database 403. Token request module 408 may then, in conjunction with processor 401, request the sensitive information or token from a token server for use on the communication device. When token request module 408 receives the sensitive information or token from the token server, token request module 408 may, in conjunction with processor 401, send the sensitive information or token to the application executing on the communication device. In some embodiments, token request module 408 may also, in conjunction with processor 401, track which sensitive information or token is provided to a particular communication device by storing this information in database 403. Thus, database 403 may include a mapping between a communication device and the sensitive information or token provisioned to that communication device.

Distance module 409 may, in conjunction with processor 401, determine if a distance between the location of the access device and the location of the communication device (received from a communication device) are within a predetermined threshold. Distance module 409 may further, in conjunction with processor 401, generate data indicating whether the distance is within a predetermined threshold.

Cryptography engine 422 may, in conjunction with processor 401, provide cryptographic functionalities for application provider computer 400. In some embodiments, cryptography engine 422 can be implemented in HSM 420, which is a specialized hardware component used to perform cryptographic operations and manage cryptographic keys. Cryptography engine 422 may, in conjunction with processor 401, implement and perform encryption/decryption operations for application provider computer 400 using encryption algorithms such as such as AES, DES, TDES/TDEA, or other suitable encryption algorithms using cryptographic keys of any length (e.g., 56-bit, 128-bit, 169-bit, 192-bit, 256-bit, etc.). In some embodiments, cryptography engine 422 can also perform hash calculations using hash functions such as secure hash algorithm (SHA), or the like. For example, when application provider computer 400 receives a session key used for encrypting sensitive information or token from a token server, application provider computer 400 may invoke cryptography engine 422 to encrypt the session key, such that session key can be provided to the application on the communication device in an encrypted form. In some embodiments, the session key can be encrypted using a hash value that is computed over the user authentication data associated with the user requesting the sensitive information or token.

Figure 5:
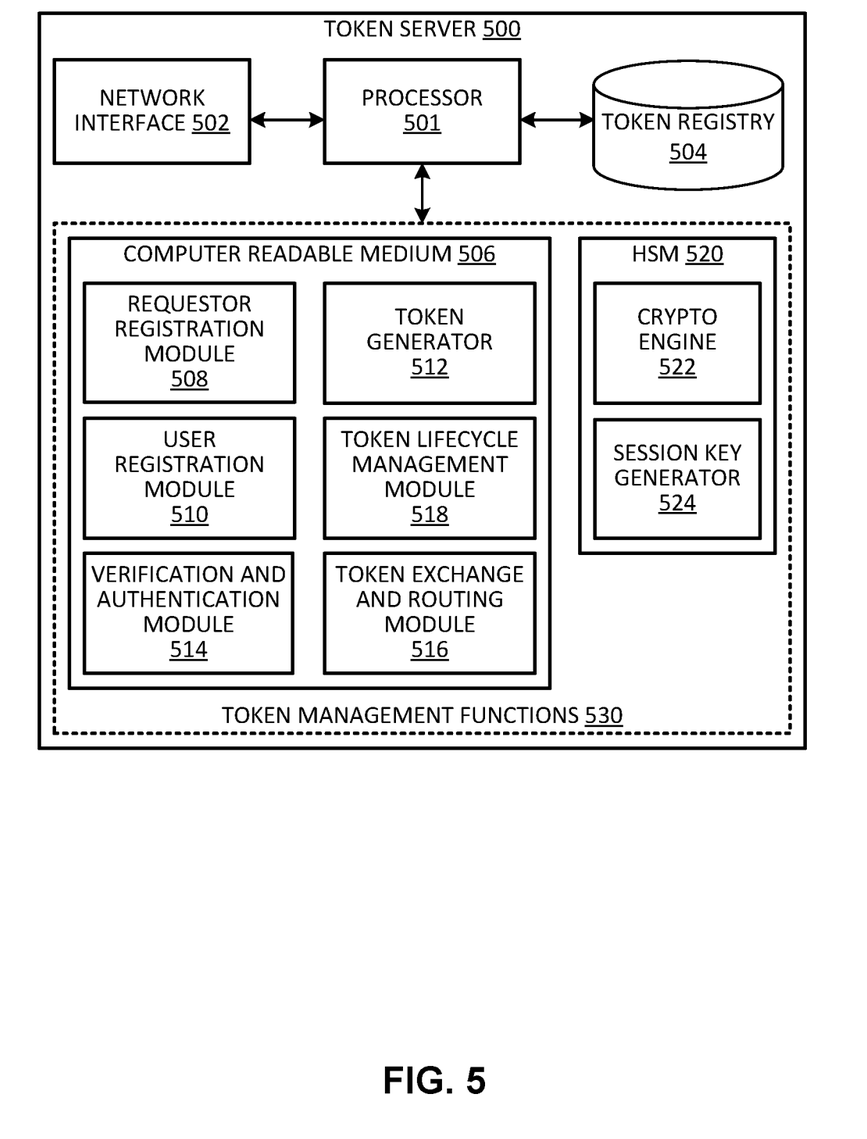
FIG. 5 shows a block diagram of a token server according to some embodiments of the present invention.

FIG. 5 shows a block diagram of a token server 500 (e.g., token server 30 of FIG. 1) according to some embodiments of the present invention. In some embodiments, one or more token server computers 500 can be used, for example, to implement a network token system. Token server computer 500 may include a processor 501 coupled to a network interface 502 and a computer readable medium 506. In some embodiments, token server computer 500 may also include a hardware security module (HSM) 520. Token server computer 500 may also include a token registry 504 that may be internal or external to token server computer 500.

Processor 501 may include one or more microprocessors to execute program components for performing the token management functions 530 of token server computer 500. Network interface 502 may be configured to connect to one or more communication networks to allow token server computer 500 to communicate with other entities such as a communication device operated by a user, an application provider computer or a token request computer, merchant computer, acquirer computer, transaction processing network computer, issuer computer, etc. Computer readable medium 506 may include any combination of one or more volatile and/or non-volatile memories, for example, RAM, DRAM, SRAM, ROM, flash, or any other suitable memory components. Computer readable medium 506 may store code executable by the processor 501 for implementing some or all of the token management functions 530 of token server computer 500 described herein. For example, computer readable medium 506 may include a requestor registration module 508, a user registration module 510, a token generator 512, a verification and authentication module 514, a token exchange and routing module 516, and a token life-cycle management module 518.

Requestor registration module 508 may register a token requestor entity (e.g., application provider) with the token registry 504, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 508 such as an entity name, contact information, an entity type (e.g., merchant, wallet provider, payment service provider, issuer, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

User registration module 510 may perform registration of users and accounts of the users. In some embodiments, token server computer 500 may allow authorized entities to register consumer accounts (e.g., payment or financial accounts) with the network token system on behalf of the users. For example, a registered token requestor may provide a token requestor ID (e.g., received at the time of registration from the requestor registration module 508), an account identifier or other sensitive information or sensitive information identifier for which a token can substitute, a consumer name and contact information, device identifier of the consumer's communication device, a token type, and any other relevant information for individual account registration or bulk account registration. In some embodiments, user registration module 510 may store the account details and sensitive information in token registry 504 for all successful activation and registration requests. In some embodiment, an authorized entity may also unregister users and accounts by providing the necessary information to token server computer 500.

Token generation module 512 can be configured to generate a token or retrieve sensitive information in response to processing a request for a token or sensitive information from a token requestor (e.g., an application provider), in conjunction with processor 501. Further, token generation module 512 can be configured to generate verification values, such as CVNs and TAVVs. In some embodiments, token generation module 512 may receive a token requestor ID and an account identifier or sensitive information identifier. In some embodiments, token generation module 512 may also receive optional information such as a user name, a user address and zip code, a requested token or sensitive information type (e.g., static, dynamic, non-payment, etc.), device identifier, and/or suitable information. In some embodiments, token generation module 512 may generate a response with the requested token or requested sensitive information, a token expiration date associated with the token, and/or a token assurance level associated with the token. In some embodiments, token generation module 512 may validate the token requestor ID and maintain the correlation between the token, the sensitive information or account identifier being substituted by the token, and the associated token requestor. In some embodiments, token generation module 512 may determine if a token already exists in token registry 504 for a token request before generating a new token. In some embodiments, if a token cannot be provisioned, the token response may include a corresponding reason code. In some embodiments, token generation module 512 may also provide an interface to the token requestors to submit a bulk token request file.

In some embodiments, the token may be generated on the fly using API calls. For example, when a request is received to tokenize an account identifier or other sensitive information, token generation module 512 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. Token registry 504 may store the relationship of the token range to the account identifier, and a token add record may be logged. In some embodiments, token generator 512 may consider the token range list associated with the account identifier range before assigning a token.

Verification and authentication module 514 may be configured to execute a consumer verification and authentication process, and determine a token assurance level based on the outcome of the verification and authentication process. For example, the verification and authentication module 514 can perform consumer authentication and verification through a configured authentication scheme. In some embodiments, the authentication scheme may include verification of the account identifier, verification values, and the expiration date based on the customer information stored in a database associated with the transaction processing network. In some embodiments, the authentication scheme may include direct verification of the consumer by the issuer using consumer credentials for their online banking system.

In some embodiments, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give issuers the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the consumer on-behalf of the issuer prior to the authorization process.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 516 may, in conjunction with the processor 501, process requests for the underlying sensitive information (e.g., an account identifier) associated with a given token. For example, a transaction processing computer, acquirer, issuer, etc. may issue a request for a token exchange during processing of a transaction. Token exchange and routing module 516 may, in conjunction with the processor 501, validate that the requesting entity is entitled to make a request for a token exchange. In some embodiments, token exchange and routing module 516 may, in conjunction with the processor 501, validate the account identifier (or other sensitive information) to token mapping and presentment mode based on the transaction timestamp and the token expiration timestamp. Token exchange and routing module 516 may, in conjunction with the processor 501, retrieve the account identifier (or other sensitive information) from token registry 504, and provide it along with the assurance level to the requesting entity. In some embodiments, if the account identifier (or other sensitive information) to token mapping is not valid for the transaction timestamp and presentment mode, an error message may be provided.

Token life-cycle management module 518 may, in conjunction with the processor 501, perform life-cycle operations on the tokens managed by token server computer 500. Life-cycle operations may include canceling a token, activating or deactivating a token, updating token attributes, renewing token with a new expiration date, etc. In some embodiments, a token requestor entity may provide a token requestor ID, a token number, a life-cycle operation identifier and one or more token attributes to token server computer 500 to perform the requested life-cycle operation on a given token. Token life-cycle management module 518 may, in conjunction with the processor 501, verify the token requestor ID and the token association based on information in token registry 504. Token life-cycle management module 518 may, in conjunction with the processor 501, perform the requested life-cycle operation on a given token, and update the corresponding associations in token registry 504. Examples of life-cycle operation may include a token activation operation to activate an inactive, suspended, or temporarily locked token and its associations; a token de-activation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

According to some embodiments, token server computer 500 may include a HSM 520 to perform secure functions such as encryption and decryption operations and generation of cryptographic keys used for the encryption and decryption operations. For example, HSM 520 may include a cryptography engine 522 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 520 may also implement a session key generator 524 to generate a session key for each token or sensitive information request that token server computer 500 processes. The generated session key can be used to encrypt a token or sensitive information generated or retrieved for the request, and the token or sensitive information can be provided to the token requestor in an encrypted form. For example, for each request that token server computer 500 receives and processes, session key generator 524 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and token server computer 500. Token generator 512 may generate or otherwise retrieve a token or sensitive information to fulfill the request. The session key can be used by cryptographic engine 522 to encrypt that token or sensitive information using an encryption algorithm, and the encrypted token or sensitive information can be provided to the token requestor. In some embodiments, the generated session key is also provided to the token requestor with the encrypted token or sensitive information.

Although token server computer 500 and application provider computer 400 have been described with a HSM implementing only some of their functions, it should be understood that other functionalities of the respective computers (e.g., token generation) can be implemented inside a HSM as well. Furthermore, some or all of the respective HSM functionalities can also be implemented outside of a HSM.

The systems and methods described herein may be implemented in a variety of contexts. For example, to complete a payment transaction, a merchant may electronically generate a code representing transaction data (e.g., merchant data, merchant location data, transaction amount, etc.) and display it on an access device. The code may be, for example, a QR code. The consumer may scan the code with his or her communication device using a camera or other visual sensor associated with the communication device. The code may be interpreted by an application on the communication device and the transaction data may be displayed to the consumer in one embodiment. The consumer may request a token at the communication device that corresponds to a payment device selected to perform the payment transaction. The token, the transaction data, and the consumer's location may be provided to an application provider computer. The application provider computer may facilitate completion of the transaction between the consumer and the merchant using the transaction data and the token, if the consumer's location is within a predetermined threshold distance of the merchant's location, as described further herein.

Figure 6:
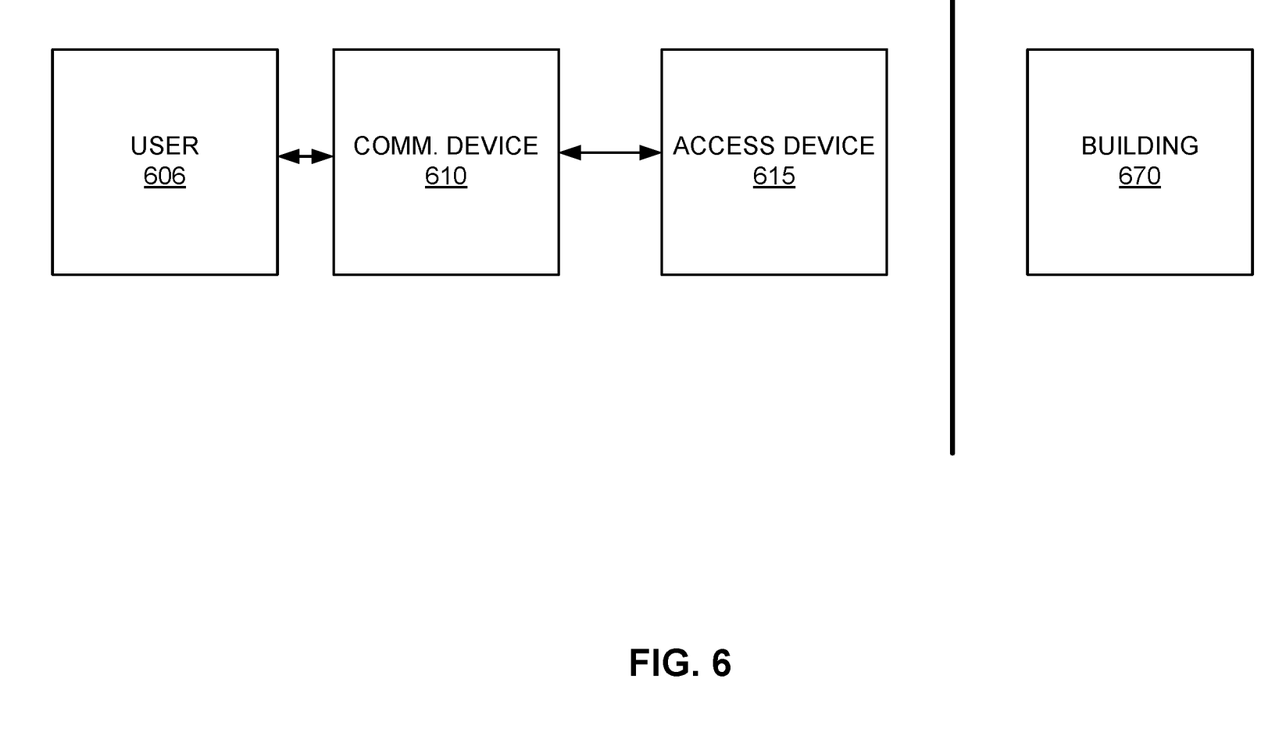
FIG. 6 shows a block diagram of a building access system according to some embodiments of the present invention.

The systems and methods described herein may also be used in access transactions. For example, FIG. 6 shows a block diagram of a building access system according to some embodiments of the invention. A user 606 may operate a communication device 610 (e.g., communication device 10 of FIG. 1 and/or communication device 600 of FIG. 3) having sensitive information (e.g., an access code). Communication device 610 may interact with access device 615 to receive the location of the access device 615. Communication device 610 may determine its own current location and determine if a distance between the location of the access device 615 and the location of the communication device 610 is within a predetermined threshold. If the distance is within a predetermined threshold, communication device 610 may transmit the sensitive information to the access device 615.

The access device 615 may locally analyze the sensitive information to determine whether access should be granted to building 670, or it may communicate with a remotely located server computer (not shown). The remotely located server computer may analyze the sensitive information to determine whether access should be granted to building 670, and may transmit a signal indicating this back to the access device 615. The access device 615 may then proceed to allow or deny access by the user 606 to the building 670, in accordance with the sensitive information.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

Like reference numerals are used to indicate like elements throughout the figures.

What is claimed:

1. A method of conducting a transaction between a user and a resource provider, the method comprising:

providing, by an access device of a resource provider system associated with the resource provider to a communication device of the user, a code comprising transaction data for the transaction, which provides the transaction data to an application provider computer, which provides a transaction identifier associated with the transaction data to a token server, wherein the transaction data comprises a location of the access device and a first time at which the location of the access device is determined, and wherein the communication device is programmed to determine a location of the communication device and a second time at which the location of the communication device is determined, calculate using a distance module on the communication device, a distance between the location of the access device and the communication device, calculate a time difference between the first time and the second time, and in response to determining that the distance is below a distance threshold and that the time difference is below a time threshold, transmit sensitive information to the application provider computer;

transmitting, by the access device to a resource provider computer in the resource provider system, the transaction data and the transaction identifier;

retrieving, by the resource provider computer from the token server, a token using the transaction identifier, the token associated with the sensitive information;

constructing, by the resource provider computer, an authorization request message comprising the transaction data and the token; and transmitting, by the resource provider computer, the authorization request message comprising the transaction data and the token to a transaction processing computer, which retrieves the sensitive information associated with the token from the token server and obtains authorization for the transaction.

2. The method of claim 1, further comprising:

receiving, by the resource provider computer, an authorization response message for the transaction from the transaction processing computer.

3. The method of claim 1, wherein the application provider computer hosts a digital wallet application operating at the communication device.

4. The method of claim 1, wherein the access device is a POS terminal.

5. The method of claim 1, wherein the code is a QR code.

6. The method of claim 1, wherein obtaining authorization for the transaction comprises transmitting the authorization request message comprising the sensitive information associated with the token to an authorizing entity computer for authorization.

7. The method of claim 6, wherein the sensitive information comprises a PAN.

8. The method of claim 1, wherein the communication device of the user also provides a location or address of the access device to the application provider computer.

9. The method of claim 1, wherein the communication device is a mobile phone.

10. The method of claim 1 wherein the token is a payment token.

11. The method of claim 1, wherein the authorization request message comprises an amount.

12. The method of claim 11, wherein the transaction is a payment transaction.

13. A system comprising:

an access device comprising a first processor, and a first non-transitory computer readable medium, the first non-transitory computer readable medium comprising code, executable by the first processor to cause the access device to perform operations including, providing, to a communication device of a user, a code comprising transaction data for a transaction, which provides the transaction data to an application provider computer, which provides a transaction identifier associated with the transaction data to a token server, wherein the transaction data comprises a location of the access device and a first time at which the location of the access device is determined, and wherein the communication device is programmed to determine a location of the communication device and a second time at which the location of the communication device is determined, calculate using a distance module on the communication device, a distance between the location of the access device and the communication device, calculate a time difference between the first time and the second time, and in response to determining that the distance is below a distance threshold and that the time difference is below a time threshold, transmit sensitive information to the application provider computer, and transmitting, by the access device to a resource provider computer in the system, the transaction data and the transaction identifier; and the resource provider computer, the resource provider computer comprising a second processor, and a second non-transitory computer readable medium, the second non-transitory computer readable medium comprising code executable by the second processor to cause the resource provider computer to perform operations including, retrieving, by the resource provider computer from the token server, a token using the transaction identifier, the token associated with the sensitive information, constructing, by the resource provider computer, an authorization request message comprising the transaction data and the token, and transmitting, by the resource provider computer, the authorization request message comprising the transaction data and the token to a transaction processing computer, which retrieves the sensitive information associated with the token from the token server and obtains authorization for the transaction.

14. The system of claim 13, wherein the access device is a POS terminal.

15. The system of claim 13, wherein the sensitive information comprises a PAN.

16. The system of claim 13, wherein the token is in a same format as the sensitive information.

17. The system of claim 13, wherein the code is a QR code.

18. The system of claim 17, wherein a location of the access device is embedded in the QR code.

19. The system of claim 17, further comprising the communication device.

* * * * *